US012706361B2

(12) United States Patent
Lyu et al.

(10) Patent No.: US 12,706,361 B2
(45) Date of Patent: Aug. 11, 2026

(54) DIELECTRIC FILTER

(71) Applicant: Suzhou Luxshare Technology Co., Ltd., Suzhou City (CN)

(72) Inventors: Shance Lyu, Suzhou City (CN); Zhenguo Song, Suzhou City (CN); Xinghua Sun, Suzhou City (CN); Guiping Gao, Suzhou City (CN)

(73) Assignee: SUZHOU LUXSHARE TECHNOLOGY CO., LTD., Suzhou City (CN)

( * ) Notice: Subject to any disclaimer, the term of this patent is extended or adjusted under 35 U.S.C. 154(b) by 100 days.

(21) Appl. No.: 18/649,648

(22) Filed: Apr. 29, 2024

(65) Prior Publication Data

US 2025/0210837 A1 Jun. 26, 2025

(30) Foreign Application Priority Data

Dec. 22, 2023 (CN) ........................ 202311786017.X

(51) Int. Cl.
*H01P 7/10* (2006.01)
*H01P 1/20* (2006.01)

(52) U.S. Cl.
CPC .............. *H01P 1/2002* (2013.01); *H01P 7/10* (2013.01)

(58) Field of Classification Search
CPC .... H01P 7/10; H01P 7/105; H01P 7/00; H01P 7/06; H01P 7/04; H01P 1/2084; H01P 1/2086; H01P 1/20
USPC ....................................................... 333/219.1
See application file for complete search history.

(56) References Cited

U.S. PATENT DOCUMENTS

2013/0249651 A1* 9/2013 Wu ......................... H01P 7/105 333/219.1
2015/0325902 A1* 11/2015 Yu ......................... H01P 1/2084 333/219.1

FOREIGN PATENT DOCUMENTS

| | | | |
|---|---|---|---|
| CN | 103531869 | A | 1/2014 |
| CN | 205069822 | U | 3/2016 |
| CN | 205911407 | U | 1/2017 |
| CN | 208723056 | U | 4/2019 |

OTHER PUBLICATIONS

Translation of CN 205069822U (Year: 2016).*
(Continued)

*Primary Examiner* — Stephen E. Jones
(74) *Attorney, Agent, or Firm* — Birch, Stewart, Kolasch & Birch, LLP

(57) ABSTRACT

A dielectric filter includes a housing, a dielectric resonator, a cover plate, and a tuning structure. A resonant slot is disposed on the housing, a support portion is disposed in the resonant slot, and the support portion encloses to form an intermodulation groove at a slot bottom of the resonant slot. The dielectric resonator is mounted on the support portion and covers a groove opening of the intermodulation groove, multiple adjustment holes are disposed on the dielectric resonator, and the multiple adjustment holes communicate with the intermodulation groove. The cover plate is connected to the housing, covers an opening of the resonant slot, and is spaced apart from the dielectric resonator. The tuning structure is connected to the cover plate, where each of the multiple adjustment holes is configured with one tuning structure.

4 Claims, 5 Drawing Sheets

(56) References Cited

OTHER PUBLICATIONS

Taiwanese Office Action and Search Report for Taiwanese Application No. 113104059, dated Mar. 19, 2025, with English translation of the Office Action.
Hu et al., "A $TM_{11}$ Dual-Mode Dielectric Resonator Filter With Planar Coupling Configuration", IEEE Transactions on Microwave Theory and Techniques, vol. 61, No. 1, Jan. 2013, pp. 131-138.

* cited by examiner

DIELECTRIC FILTER

CROSS-REFERENCE TO RELATED APPLICATION(S)

This application claims priority to Chinese Patent Application No. 202311786017.X filed Dec. 22, 2023, the disclosure of which is incorporated herein by reference in its entirety.

TECHNICAL FIELD

The present disclosure relates to the technical field of radio frequency products and, in particular, to a dielectric filter.

BACKGROUND

There are many types of filters, and different types of filters are each applied to different frequency ranges and scenarios. A dielectric filter is formed by a coupling between dielectric resonators. The dielectric filter has a high Q value, a low insertion loss, a small size, and a light weight, and is widely used in a system such as a wireless base station, a satellite communication, a navigation system, and an electronic countermeasure.

An existing single-ended short-circuited dielectric filter includes a housing, a cover plate disposed on the housing, a dielectric resonator disposed in the housing, a support member configured to support the dielectric resonator, and a tuning structure. The dielectric resonator is usually placed in a central position of an inner cavity of the housing, and is supported and fixed by the support member. The support member is fixedly connected to a bottom of the inner cavity of the housing by using the screw, so that the support member is deformed and damaged due to the stress concentration, and thus the dielectric filter cannot work normally.

SUMMARY

The present disclosure provides a dielectric filter that can securely and reliably support a dielectric resonator.

The following technical schemes are adopted in the present disclosure.

A dielectric filter includes a housing, a dielectric resonator, a cover plate, and a tuning structure. A resonant slot is disposed on the housing, a support portion is disposed in the resonant slot, and the support portion encloses to form an intermodulation groove at a slot bottom of the resonant slot. The dielectric resonator is mounted on the support portion and covers a groove opening of the intermodulation groove, multiple adjustment holes are disposed on the dielectric resonator, and the multiple adjustment holes communicate with the intermodulation groove. The cover plate is connected to the housing, covers an opening of the resonant slot, and is spaced apart from the dielectric resonator. The tuning structure is connected to the cover plate, where each of the multiple adjustment holes is configured with one tuning structure.

REFERENCE LIST

Figure 1:
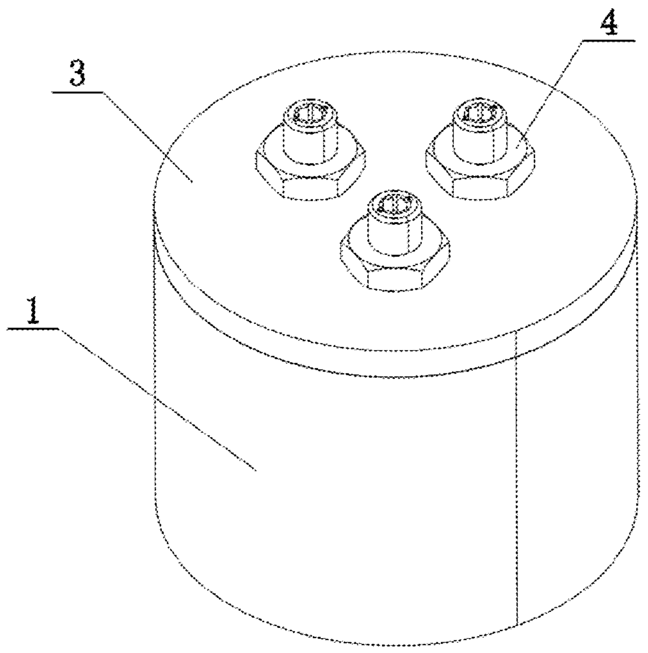
FIG. 1 is a schematic structural diagram of a dielectric filter according to an embodiment one of the present disclosure.

1 housing
- 11 resonant slot
- 12 support portion
- 121 annular boss
- 122 annular bushing
- 123 support block
- 13 intermodulation groove
- 2 dielectric resonator
- 21 adjustment hole
- 3 cover plate
- 4 tuning structure
- 41 adjustment screw rod
- 42 locking nut

DETAILED DESCRIPTION

Embodiments of the present disclosure will be described in detail below, examples of the described embodiments are shown in the accompanying drawings, where same or similar reference numerals refer to same or similar parts or parts having same or similar functions throughout. The embodiments described below with reference to the accompanying drawings are exemplary, are intended to explain the present disclosure, and are not be construed as limiting the present disclosure.

In the description of the present disclosure, unless otherwise expressly specified and limited, the term "connected to each other", "connected", or "fixed" is to be construed in a broad sense, for example, as securely connected, or detachably connected; mechanically connected or electrically connected; directly connected to each other, indirectly connected to each other via an intermediary, internal connection between two elements, or interaction between two elements. For those of ordinary skill in the art, specific meanings of the preceding terms in the present disclosure may be understood based on specific situations.

In the description of the present disclosure, unless otherwise expressly specified and limited, a first feature being "on" or "under" a second feature may include the first feature and the second feature being in direct contact, or may include the first feature and the second feature not being in direct contact but being in contact with each other through an additional feature therebetween. Moreover, the first feature being "on", "above" or "over" the second feature includes the first feature being directly on, above or over and obliquely on, above or over the second feature, or simply indicates that the first feature is at a higher level than the second feature. The first feature being "under", "below" or "underneath" the second feature includes the first feature being directly under, below or underneath and obliquely under, below or underneath the second feature, or simply represents that the first feature is at a lower level than the second feature.

The technical schemes of the present disclosure are further explained hereinafter in conjunction with accompanying drawings and the specific implementation.

Embodiment One

As shown in FIG. 1 to FIG. 9, the present disclosure provides a dielectric filter. The dielectric filter includes a housing 1, a dielectric resonator 2, a cover plate 3 and a tuning structure 4. A resonant slot 11 is disposed on the housing 1, a support portion 12 is disposed in the resonant slot 11, and the support portion 12 encloses to form an intermodulation groove 13 at a slot bottom of the resonant slot 11. The dielectric resonator 2 is mounted on the support portion 12 and covers a groove opening of the intermodulation groove 13, multiple adjustment holes 21 are disposed on the dielectric resonator 2, and the multiple adjustment holes 21 communicate with the intermodulation groove 13. The cover plate 3 is connected to the housing 1, covers an opening of the resonant slot 11, and is spaced apart from the dielectric resonator 2. The tuning structure 4 is connected to the cover plate 3, where each of the multiple adjustment holes 21 is configured with one tuning structure 4.

In the present disclosure, the support portion 12 is disposed in the resonance slot 11 of the housing 1, so that the dielectric resonator 2 can be securely and reliably supported. Based on this, the support portion 12 encloses to form the intermodulation groove 13, so that the contact area between the dielectric resonator 2 and the support portion 12 is reduced, the influence of the low-end resonance of the dielectric resonator 2 on the dielectric filter is effectively removed, and the passive intermodulation performance of the dielectric filter is enhanced. Moreover, the multiple adjustment holes 21 share one intermodulation groove 13, so that a step that the dielectric resonator 2 is mounted on the support portion 12 in a aligned manner is omitted, thereby effectively reducing processing and preparation costs of the housing 1.

Optionally, one end of the dielectric resonator 2 towards the support portion 12 is provided with a silver plating layer, and the dielectric resonator 2 is welded to the support portion 12 through the silver plating layer. With the above arrangement, the technical problem that the welding operation between the dielectric resonator 2 and the support portion 12 is difficult to be performed is overcome.

Optionally, the dielectric resonator 2 is of a cylindrical structure, and the multiple adjustment holes 21 are disposed uniformly around an axis of the dielectric resonator 2.

Optionally, three adjustment holes 21 are provided, the housing 1 is of a cylindrical structure, an inner wall of the housing 1 is spaced apart from an outer wall of the dielectric resonator 2, and a diameter of the resonant slot 11 gradually decreases from a slot opening to the slot bottom, thereby further simplifying the structure and reducing the overall volume.

In this embodiment, the tuning structure 4 includes an adjustment screw rod 41 and a locking nut 42. The adjustment screw rod 41 is screwed into the cover plate 3, and an axis is parallel to the axis of the dielectric resonator 2. The locking nut 42 is screwed into the adjustment screw rod 41, and abuts against a side of the cover plate 3 facing away from the housing 1.

According to the dielectric filter of this embodiment, a single-ended short-circuited manner is used, the dielectric resonator 2 is configured to make the three adjustment holes 21 fit with three tuning structures 4, whereby two resonance frequencies may be generated, so that the Q value of the dielectric filter can be effectively improved by about 60%, the volume of the dielectric filter can be effectively reduced by about 35%-40%, the maximum field strength of the dielectric resonator 2 can be effectively reduced, and the power indicator of the dielectric filter can be effectively improved. Moreover, the structure in which the dielectric resonator 2 is disposed on the cover plate 3 by pressure bonding may be omitted, the stability of the product can be improved, the influence of the low-end resonance of the dielectric resonator 2 on the dielectric filter can be effectively removed, the mounting of the support seat can be cancelled, the provision of the dielectric mounting hole can be cancelled, the design form of the cover plate 3 is more free, for example, the cover plate 3 may be connected to the housing 1 via a screw or welding, whereby the material cost is effectively reduced, the quality factor of the resonator is improved by loading a dielectric with a high dielectric constant, and thus the insertion loss of the filter is improved.

Embodiment Two

Figure 2:
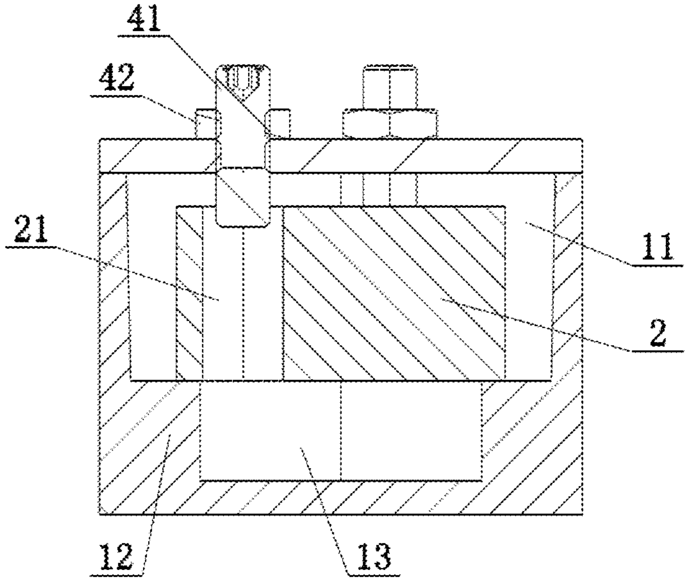
FIG. 2 is a sectional diagram of a dielectric filter according to an embodiment two of the present disclosure.
Figure 3:
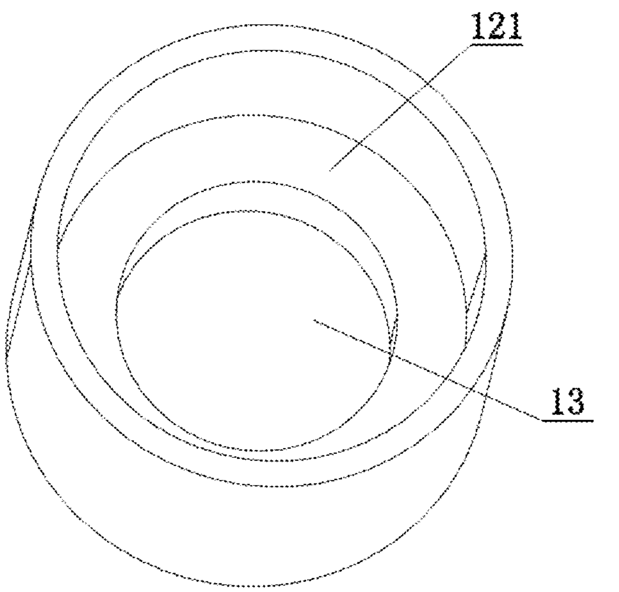
FIG. 3 is a schematic structural diagram of a housing according to an embodiment two of the present disclosure.

As shown in FIG. 2 and FIG. 3, on the basis of the embodiment one, this embodiment provides a dielectric filter. The support portion 12 includes an annular boss 121. The annular boss 121 is integrally formed with and connected to a slot bottom and/or a slot wall of the resonant slot 11, and the dielectric resonator 2 is mounted on the annular boss 121. With the above arrangement, the support portion 12 is integrally formed on the housing 1, eliminating the need for screws and avoiding stress concentration in the support portion 12.

In this embodiment, the annular boss 121 is obtained by machining in the housing 1 with a numerically controlled lathe. An inner diameter of the annular boss 121 is not less than a maximum distance between an inner wall surface of the adjustment hole 21 and the axis of the dielectric resonator 2, and is less than an outer diameter of the dielectric resonator 2. The housing 1, the annular boss 121 and the dielectric resonator 2 are coaxially disposed, and a bottom surface of the dielectric resonator 2 is connected to a top surface of the annular boss 121.

In one implementation, the annular boss 121 is integrally formed with and connected to the slot bottom and the slot wall of the resonant slot 11. In another implementation, the annular boss 121 is integrally formed with and connected to the slot bottom of the resonant slot 11, and is spaced apart from the slot wall of the resonant slot 11. In still another implementation, the annular boss 121 is integrally formed with and connected to the slot wall of the resonant slot 11, and is disposed at an interval from the slot bottom of the resonant slot 11.

Embodiment Three

Figure 4:
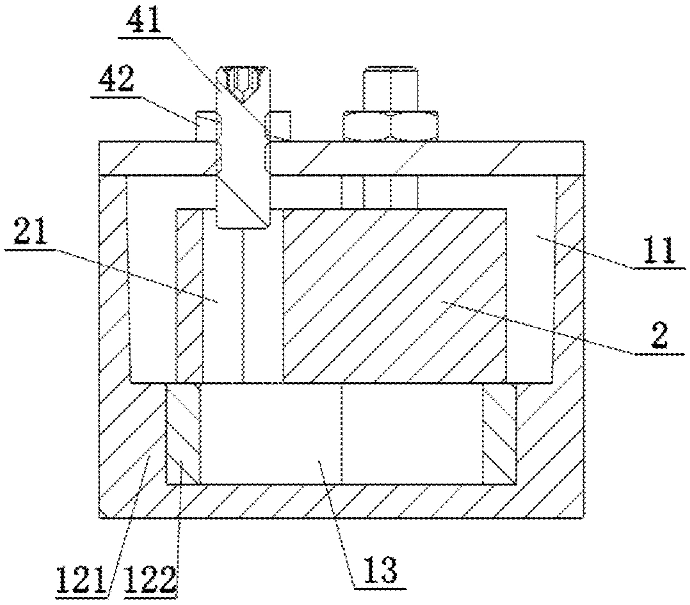
FIG. 4 is a sectional diagram of a dielectric filter according to an embodiment three of the present disclosure.
Figure 5:
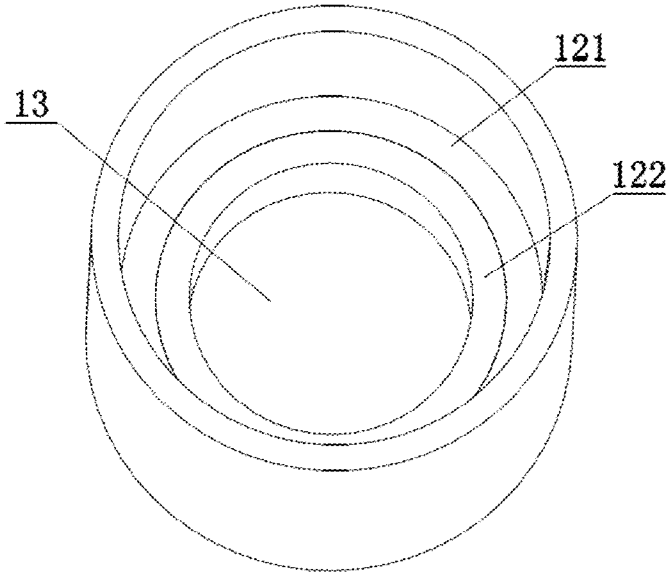
FIG. 5 is a schematic structural diagram of a housing according to an embodiment three of the present disclosure.

As shown in FIG. 4 and FIG. 5, on the basis of the embodiment one, this embodiment provides a dielectric filter. The support portion 12 includes an annular boss 121 and an annular bushing 122. The annular boss 121 is integrally formed with and connected to a slot bottom and/or a slot wall of the resonant slot 11. The annular bushing 122 is mounted in the annular boss 121, and the dielectric resonator 2 is mounted on the annular bushing 122. With the above arrangement, it is easy to remove the dielectric resonator 2 from the housing 1, thereby facilitating maintenance and replacement.

Optionally, the annular bushing 122 is press-riveted or screwed into the annular boss 121, allowing convenient disassembly and assembly of the annular bushing 122 in the annular boss 121.

In this embodiment, the annular boss 121 is obtained by machining in the housing 1 with the numerically controlled lathe, and then the annular bushing 122 is assembled in the annular boss 121. An inner diameter of the annular bushing 122 is not less than a maximum distance between an inner wall surface of the adjustment hole 21 and the axis of the dielectric resonator 2, and is less than an outer diameter of the dielectric resonator 2. An outer diameter of the annular bushing 122 is not less than the outer diameter of the dielectric resonator 2. The housing 1, the annular boss 121, the annular bushing 122 and the dielectric resonator 2 are coaxially disposed, and a bottom surface of the dielectric resonator 2 is connected to a top surface of the annular bushing 122.

In one implementation, the annular boss 121 is integrally formed with and connected to the slot bottom and the slot wall of the resonant slot 11. In another implementation, the annular boss 121 is integrally formed with and connected to the slot bottom of the resonant slot 11, and is spaced apart from the slot wall of the resonant slot 11. In still another implementation, the annular boss 121 is integrally formed with and connected to the slot wall of the resonant slot 11, and is disposed at an interval from the slot bottom of the resonant slot 11.

Embodiment Four

As shown in FIG. 6 to FIG. 9, on the basis of the embodiment one, this embodiment provides a dielectric filter. The support portion 12 includes multiple support blocks 123 integrally formed with and connected to a slot bottom of a resonance slot 11, the multiple support blocks 123 enclose to form the intermodulation groove 13, and the dielectric resonator 2 is mounted on the multiple support blocks 123. With the above arrangement, the contact area between the dielectric resonator 2 and the support portion 12 is further reduced.

Optionally, the support block 123 is of an arc-shaped structure whose axis is the axis of the dielectric resonator 2. With the above arrangement, the support block 123 may support the dielectric resonator 2 more stably and reliably.

Optionally, in a radial direction of the dielectric resonator 2, a projection of the adjustment hole 21 on a slot wall of the resonant slot 11 is located between projections of two adjacent support blocks 123 on the slot wall of the resonant slot 11. This arrangement prevents interference of the support block 123 with the adjustment hole 21.

In this embodiment, the support block 123 is obtained by machining in the housing 1 with the numerically controlled lathe, and three support blocks 123 are provided. The three support blocks 123 are disposed uniformly around the axis of the dielectric resonator 2, an inner diameter of the support block 123 is not less than a maximum distance between an inner wall surface of the adjustment hole 21 and the axis of the dielectric resonator 2, and is less than an outer diameter of the dielectric resonator 2, and an outer diameter of the support block 123 is not less than the outer diameter of the dielectric resonator 2. The housing 1, the support block 123 and the dielectric resonator 2 are coaxially disposed, and a bottom surface of the dielectric resonator 2 is connected to a top surface of the support block 123.

Figure 6:
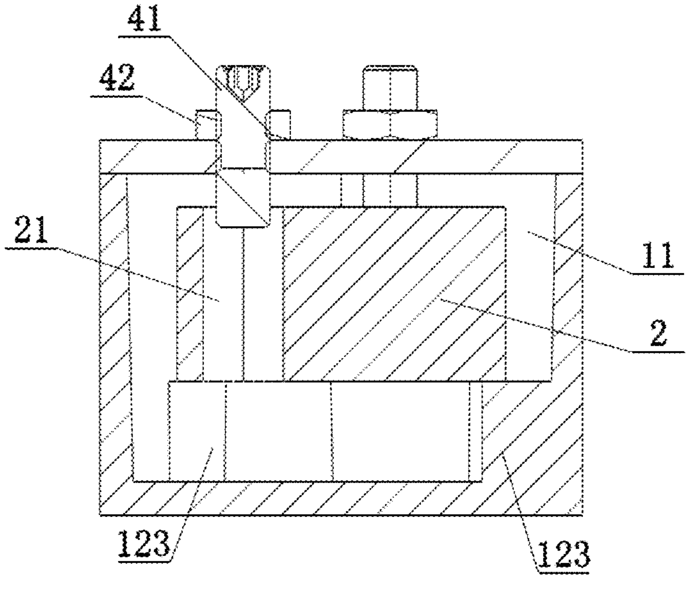
FIG. 6 is a sectional diagram of a dielectric filter according to an embodiment four of the present disclosure.
Figure 7:
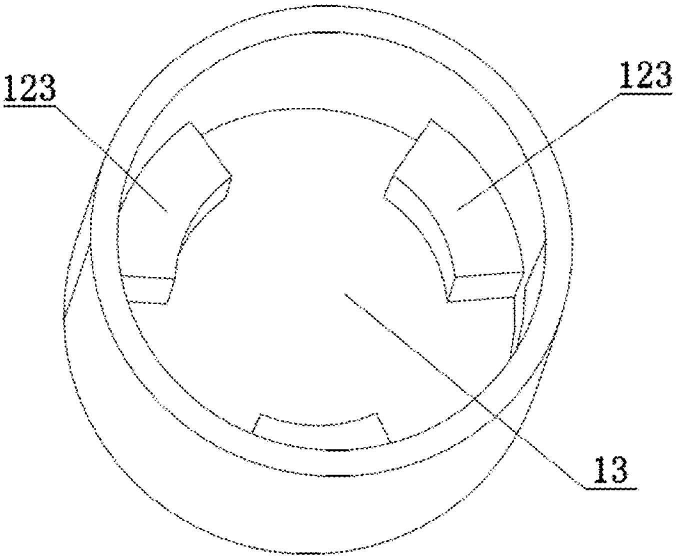
FIG. 7 is a schematic structural diagram of a housing according to an embodiment four of the present disclosure.
Figure 8:
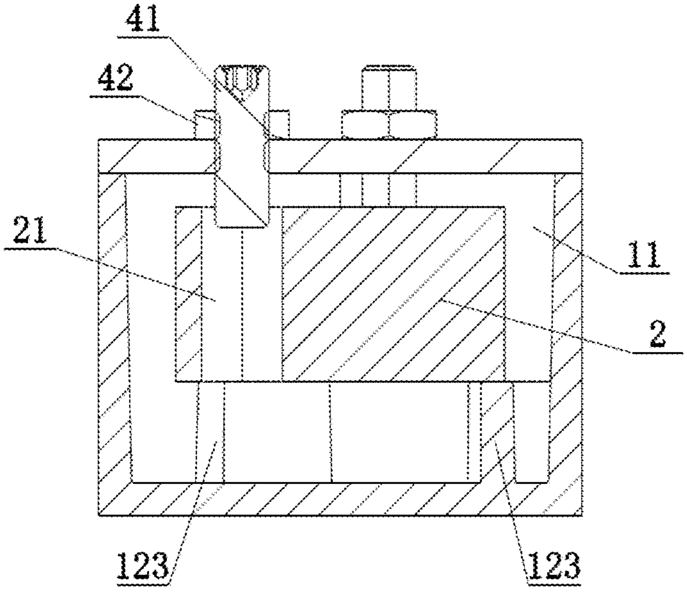
FIG. 8 is a sectional diagram of another dielectric filter according to an embodiment four of the present disclosure.
Figure 9:
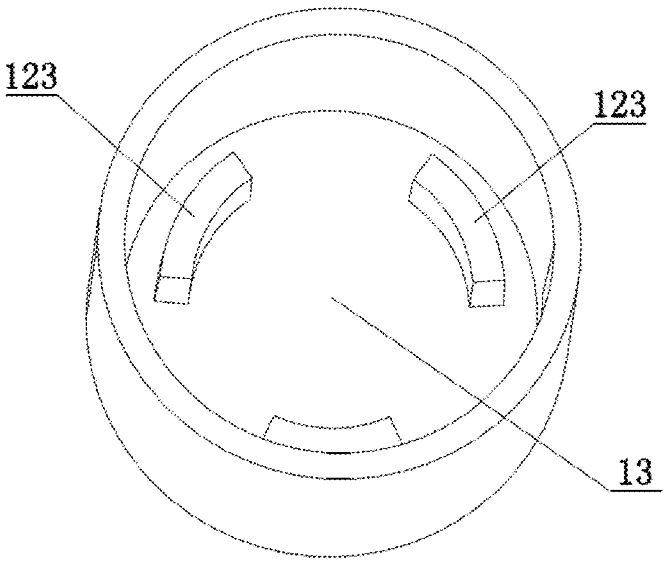
FIG. 9 is a schematic structural diagram of another housing according to an embodiment four of the present disclosure.

In an implementation manner, as shown in FIG. 6 and FIG. 7, the support block 123 is integrally formed with and connected to the slot wall of the resonant slot 11. In another implementation, as shown in FIG. 8 and FIG. 9, the support block 123 is spaced apart from the slot wall of the resonant slot 11.

The support portion is disposed in the resonance slot of the housing, so that the dielectric resonator can be securely and reliably supported. Based on this, the support portion encloses to form the intermodulation groove, so that the contact area between the dielectric resonator and the support portion is reduced, the influence of the low-end resonance of the dielectric resonator on the dielectric filter is effectively removed, and the passive intermodulation performance of the dielectric filter is enhanced. In addition, the multiple adjustment holes share one intermodulation groove, so that a step that the dielectric resonator is mounted on the support portion in a aligned manner is omitted, thereby effectively reducing processing and preparation costs of the housing.

What is claimed is:

1. A dielectric filter, comprising:

a housing, wherein a resonant slot is disposed on the housing, a support portion is disposed in the resonant slot, and the support portion encloses to form an intermodulation groove at a slot bottom of the resonant slot;

a dielectric resonator, wherein the dielectric resonator is mounted on the support portion and covers a groove opening of the intermodulation groove, a plurality of adjustment holes are disposed on the dielectric resonator, and the plurality of adjustment holes communicate with the intermodulation groove;

a cover plate, wherein the cover plate is connected to the housing, covers an opening of the resonant slot, and is spaced apart from the dielectric resonator; and a tuning structure, wherein the tuning structure is connected to the cover plate, and each of the plurality of adjustment holes is configured with one tuning structure;

wherein the support portion comprises an annular boss and an annular bushing, the annular boss is integrally formed with and connected to the slot bottom and/or a slot wall of the resonant slot, the annular bushing is mounted in the annular boss, and the dielectric resonator is mounted on the annular bushing.

2. The dielectric filter of claim 1, wherein the annular bushing is press-riveted or screwed into the annular boss.

3. The dielectric filter of claim 2, wherein one end of the dielectric resonator towards the support portion is provided with a silver plating layer, and the dielectric resonator is welded to the support portion through the silver plating layer.

4. The dielectric filter of claim 1, wherein one end of the dielectric resonator towards the support portion is provided with a silver plating layer, and the dielectric resonator is welded to the support portion through the silver plating layer.

* * * * *